US008411418B2

(12) United States Patent
Kikukawa et al.

(10) Patent No.: US 8,411,418 B2
(45) Date of Patent: Apr. 2, 2013

(54) VACUUM INSULATED SWITCHGEAR

(75) Inventors: Shuichi Kikukawa, Hitachi (JP); Kenji Tsuchiya, Hitachi (JP); Yuuko Kajiyama, Hitachiohta (JP); Daisuke Sugai, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 12/853,397

(22) Filed: Aug. 10, 2010

(65) Prior Publication Data

US 2011/0058311 A1 Mar. 10, 2011

(30) Foreign Application Priority Data

Sep. 7, 2009 (JP) ................................ 2009-206041

(51) Int. Cl.
*H02B 1/20* (2006.01)
*H02B 11/00* (2006.01)
(52) U.S. Cl. ........ 361/611; 361/612; 361/618; 361/619; 361/604; 361/605; 361/621
(58) Field of Classification Search .................. 361/611, 361/612, 618, 619, 604, 605, 621; 218/118, 218/120, 140
See application file for complete search history.

(56) References Cited

U.S. PATENT DOCUMENTS

| | | | | |
|---|---|---|---|---|
| 4,744,002 A * | 5/1988 | Nakano et al. | ................. | 361/612 |
| 4,821,141 A * | 4/1989 | Torimi et al. | ................. | 361/612 |
| 4,837,662 A * | 6/1989 | Takeuchi et al. | .............. | 361/618 |
| 4,967,307 A * | 10/1990 | Itou et al. | ....................... | 361/618 |
| 5,898,565 A * | 4/1999 | Yamauchi et al. | ............ | 361/612 |
| 6,219,225 B1 * | 4/2001 | Tsuzura et al. | ................ | 361/612 |
| 6,515,247 B1 * | 2/2003 | Tsuzura et al. | ................. | 218/43 |
| 7,425,687 B2 * | 9/2008 | Morita et al. | ................. | 218/120 |
| 7,679,022 B2 * | 3/2010 | Tsuchiya et al. | .............. | 218/120 |
| 7,897,890 B2 * | 3/2011 | Kikukawa et al. | ............ | 218/140 |
| 7,902,479 B2 * | 3/2011 | Tsuchiya et al. | .............. | 218/120 |
| 7,902,480 B2 * | 3/2011 | Tsuchiya et al. | .............. | 218/120 |
| 7,983,023 B2 * | 7/2011 | Shoda et al. | ................... | 361/606 |
| 8,008,594 B2 * | 8/2011 | Kurogi et al. | ................. | 218/119 |
| 8,035,054 B2 * | 10/2011 | Ozawa et al. | .................... | 218/55 |
| 2008/0007896 A1 * | 1/2008 | Tsuchiya et al. | .............. | 361/612 |
| 2008/0308532 A1 * | 12/2008 | Tsuchiya et al. | .............. | 218/118 |
| 2009/0020507 A1 * | 1/2009 | Kurogi et al. | ................. | 218/119 |

FOREIGN PATENT DOCUMENTS

| | | | |
|---|---|---|---|
| DE | 92 02 810 U1 | | 4/1992 |
| EP | 924827 A1 | * | 6/1999 |
| EP | 1 814 131 A2 | | 8/2007 |
| EP | 2 073 331 A2 | | 6/2009 |
| JP | 08335430 A | * | 12/1996 |
| JP | 2000228806 A | * | 8/2000 |
| JP | 2009-27767 A | | 2/2009 |

* cited by examiner

*Primary Examiner* — Anatoly Vortman
(74) *Attorney, Agent, or Firm* — Mattingly & Malur, PC

(57) ABSTRACT

The vacuum insulated switchgear includes: a housing enclosing a control compartment, a switch compartment, and a busbar compartment, each of the three compartments being partitioned by a metallic earthing plate; a first busbar and second busbar extended from an adjacent panel, in the busbar compartment; and a first busbar-connecting bushing and second busbar-connecting bushing making the first and second busbars connectible/disconnectible; a double-breaking three position vacuum switch, two sets of earthing switches, the first busbar-connecting bushing, and the second busbar-connecting bushing being integrally molded to form a switch provided on an electrical phase-by phase basis independently, wherein the switches for three phases are arranged in order side by side in the housing.

6 Claims, 14 Drawing Sheets

VACUUM INSULATED SWITCHGEAR

BACKGROUND OF THE INVENTION

1. Field of the Invention

The present invention relates generally to compact, lightweight vacuum insulated switchgears, and more particularly, to a vacuum insulated switchgear improved in operability and safety of a bus section panel.

2. Description of the Related Art

In general, vacuum insulated switchgears in power receiving/transforming equipment have busbars divided into a plurality of busbar sections to shorten a power interruption time associated with a busbar accident, and to improve the working efficiency of maintenance and inspection. One busbar section is constituted by a plurality of feeder panels arranged as panel arrays. A bus section panel that includes a circuit breaker to connect/disconnect busbars between two busbar sections is disposed between the panel array that constitutes one of the two busbar sections, and the panel array that constitutes the other busbar section.

Each feeder panel arranged in one panel array has, for example, vacuum switches of a double-break three-position type or the like, arranged in three horizontal lines on a single-phase basis as viewed from the front of the panel array. One connector for busbar connection is provided at an upper section of each vacuum switch, and longitudinal dimensions of these connectors from the front of the panel array vary from phase to phase. The busbars of each phase in the panel array can therefore be arranged next to one another in a lateral direction of the feeder panel.

In the bus section panel, on the other hand, vacuum switches of the double-break three-position type or the like are arranged in three horizontal lines on a single-phase basis as viewed from the front of the panel array, and two connectors for connection to different busbars are provided at both upper front and upper rear sections of each vacuum switch.

For example, busbars from the feeder panel located next to the immediate right of the above feeder panel are connected to an upper front connector of the double-break three-position vacuum switch. Likewise, busbars from the immediate left feeder panel are connected to an upper rear connector of the switch. These facts indicate that between the bus section panel and the feeder panel, since the busbars of each phase were unable to be connected in an adjacently arranged condition in the lateral direction of the panel, it has been likely for one busbar to interfere with the other busbars during the arrangement of each busbar.

In view of the problems described above, JP-2009-27767-A proposes a bus section panel in which busbar height differs for each phase.

The vacuum switches of the double-break three-position type (or the like) provided in the bus section panel establish and release busbar connection between different busbar sections. For inspection in the immediately right busbar section of the bus section panel (i.e., the panel array of a feeder panel), busbar connection to the immediately left busbar section (i.e., the panel array of another feeder panel) is released by opening a circuit breaker, for example. Additionally, an earthing switch corresponding to the immediately right busbar section inspected may be activated by earthing the busbars of the busbar section to ensure working safety.

In the bus section panel of the vacuum insulated switchgear discussed above, for example, when one of adjacent busbar sections is electrically charged, each vacuum switch is also charged at either of its front or rear side. When the bus section panel is visually seen from the front thereof, therefore, which of the adjacent busbar sections is charged cannot be readily discriminated. Charged internal panel constituent elements cannot be clearly discriminated either.

In addition, in the bus section panel, either or both of the adjacent busbar sections are usually charged and both very seldom enter a non-charged state. This makes it difficult to internally inspect the bus section panel itself under the non-charged state. For this reason, a vacuum insulated switchgear with a bus section panel that allows charged internal constituent elements of the panel to be checked for and a state of its busbar sections to be confirmed structurally, visually, and easily, is desired for safe inspection of the panel interior.

The present invention is based on the above, and an object of the invention is to provide a vacuum insulated switchgear including a bus section panel adapted to allow both an on/off state of a housing-contained circuit breaker and earthing switch, and a connection state of busbars in busbar sections to be confirmed structurally and visually from front.

SUMMARY OF THE INVENTION

In order to achieve the above object, an aspect of the present invention is a vacuum insulated switchgear comprising: a housing enclosing a control compartment, a switch compartment, and a busbar compartment, each of the three compartments being partitioned by a metallic earthing plate; a circuit-breaking/disconnecting switch region provided in the switch compartment; an operating device for the switch region; two sets of earthing switch regions provided in the switch compartment; an operating device for each of the earthing switch regions; a first busbar and second busbar extended from an adjacent panel, in the busbar compartment; and a first busbar-connecting bushing and second busbar-connecting bushing provided in the busbar compartment and making the first and second busbars connectible/disconnectible; the switch region, the earthing switch regions, the first busbar-connecting bushing, and the second busbar-connecting bushing being integrally molded to form a switch provided on an electrical phase-by-phase basis independently. The switches for three phases are arranged in order side by side in the housing, in a longitudinal direction of the housing as viewed from its front. Additionally, the first busbar-connecting bushing in each switch is located to the left side of the housing front, and the second busbar-connecting bushing is located to the right side of the housing front.

According to the present invention, a bus section panel with busbar-connecting bushings arranged at upper left and right sides of a switch existing when the panel is viewed from the front, and at least one feeder panel arranged at both the left and right sides of the bus section panel are arranged in array form, thereby to constitute a vacuum insulated switchgear. Busbar sections can therefore be readily discriminated from the panel front, and busbar connection routes are simplified. The vacuum insulated switchgear consequently improves working efficiency of internal inspection of the bus section panel as well as its busbar connection, and operational convenience under normal operating conditions.

DESCRIPTION OF THE PREFERRED EMBODIMENT

Hereunder, an embodiment of a vacuum insulated switchgear according to the present invention will be described with reference to the accompanying drawings.

Figure 1:
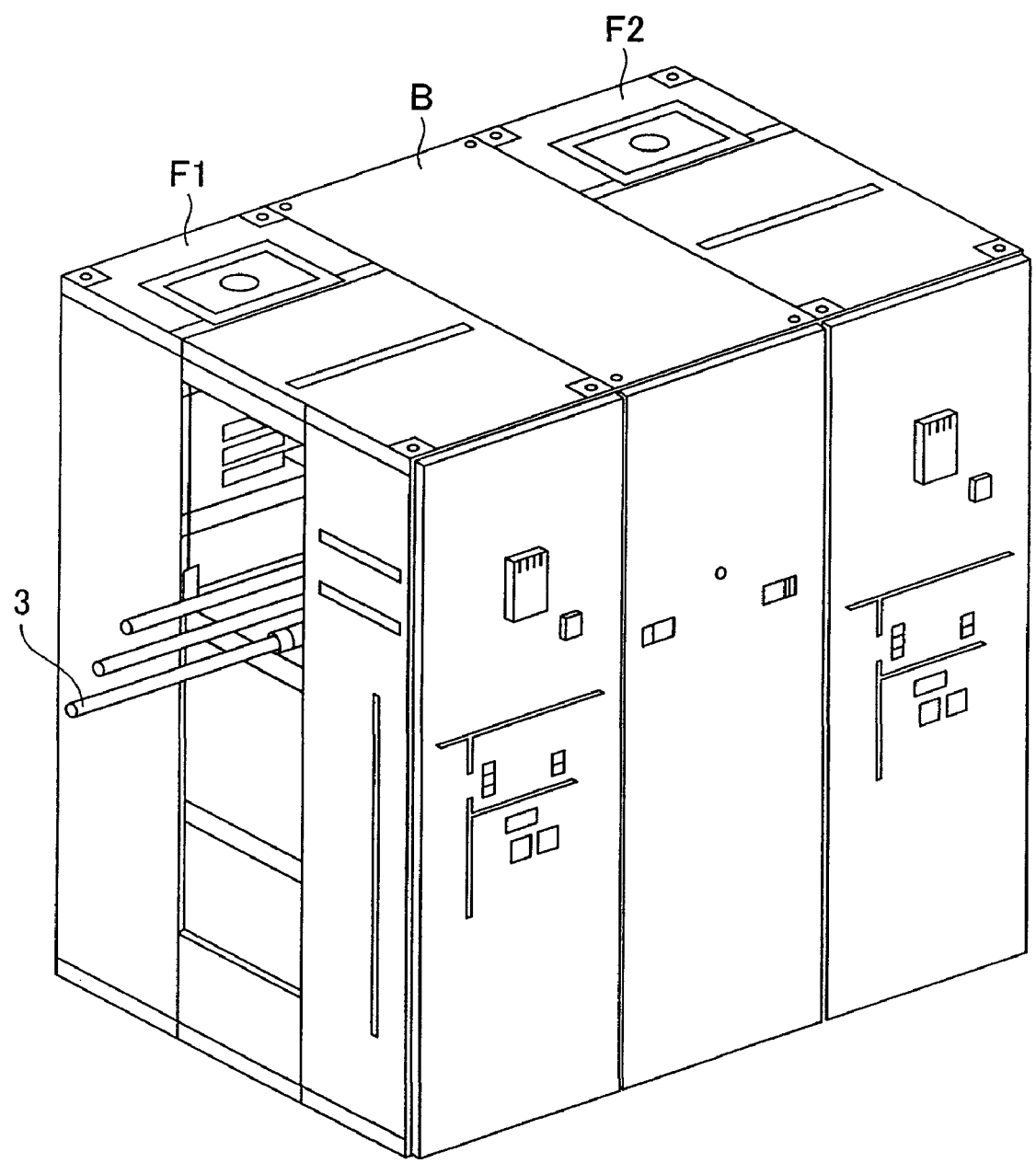
FIG. 1 is a perspective view illustrating an embodiment of a vacuum insulated switchgear of the present invention, the switchgear including a bus section panel and feeder panels disposed in array form with the section panel.
Figure 2:
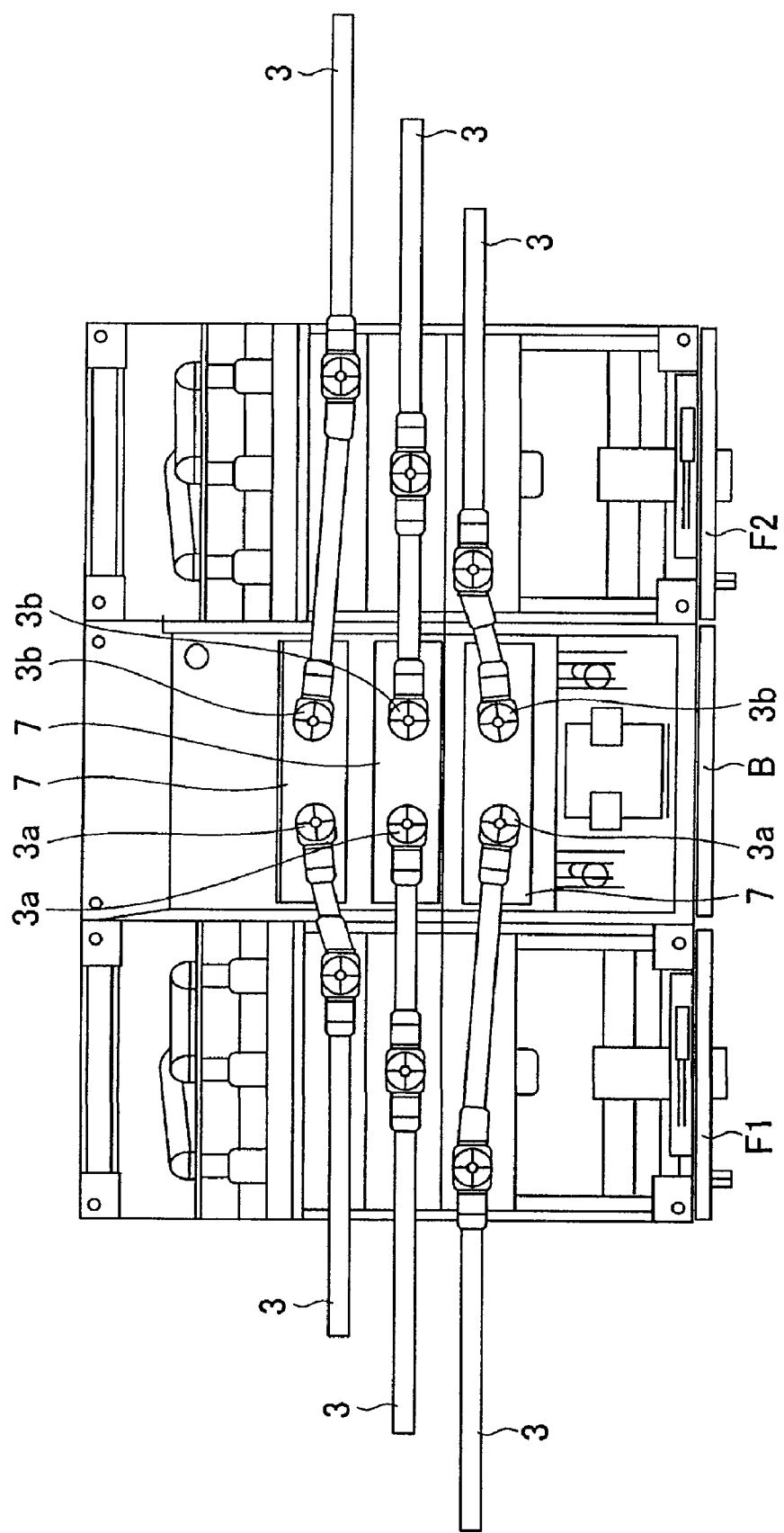
FIG. 2 is a plan view illustrating a connection state of busbars in the embodiment of the vacuum insulated switchgear shown in FIG. 1.
Figure 3:
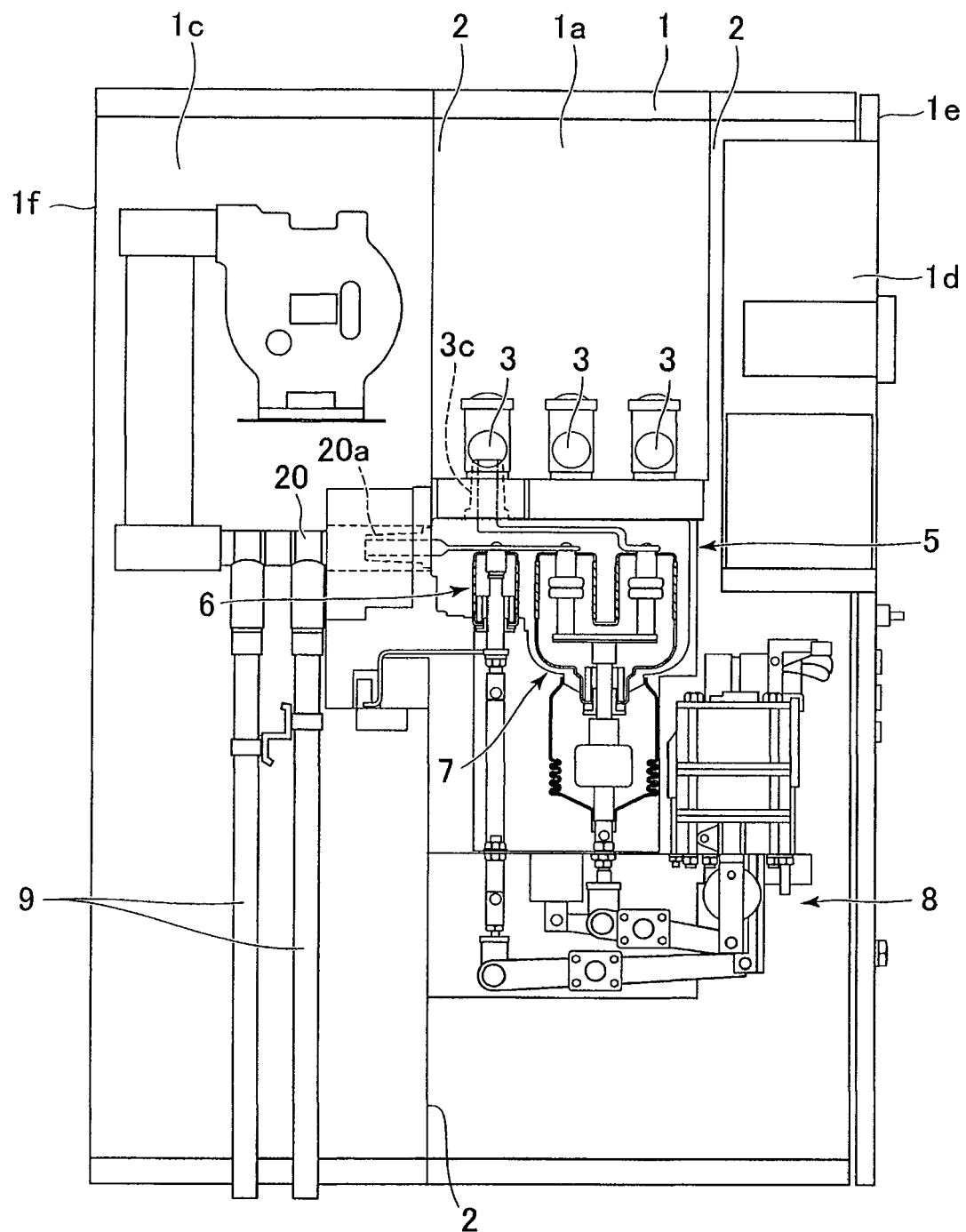
FIG. 3 is a longitudinal side view that illustrates one of the feeder panels forming a part of the vacuum insulated switchgear of the present invention shown in FIG. 1.
Figure 4:
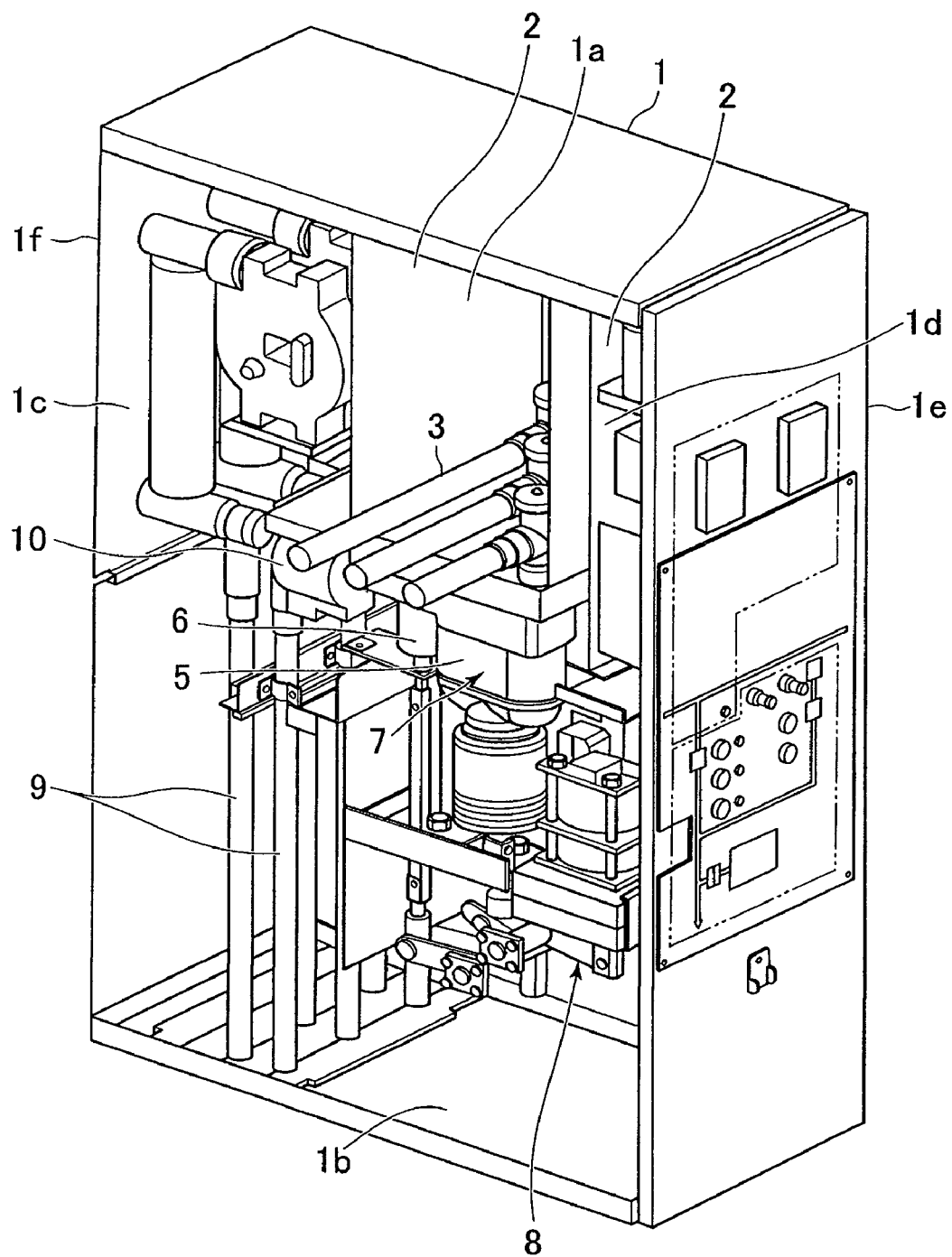
FIG. 4 is a perspective view illustrating the feeder panel of FIG. 3.

FIGS. 1 to 4 show an embodiment of the vacuum insulated switchgear of the present invention. FIG. 1 is a perspective view illustrating the embodiment of the vacuum insulated switchgear of the present invention, the switchgear including a bus section panel and feeder panels disposed in array form with the section panel. FIG. 2 is a plan view illustrating a connection state of busbars in the embodiment of the vacuum insulated switchgear shown in FIG. 1. FIG. 3 is a longitudinal side view that illustrates one of the feeder panels forming a part of the vacuum insulated switchgear shown in FIG. 1. FIG. 4 is a perspective view that illustrates the feeder panel of FIG. 3.

The embodiment of the vacuum insulated switchgear shown in FIG. 1 has an array of panels including a bus section panel B, a first feeder panel F1 disposed at a left side of the bus section panel B, and a second feeder panel F2 disposed at a right side of the bus section panel B. Busbars 3 are connected between the panels. More specifically, as shown in FIG. 2, the busbars 3 in the second feeder panel F2 are connected to second busbar-connecting bushings 3b at an upper right section of switches (described later herein) in the bus section panel B, and the busbars 3 in the first feeder panel F1 are likewise connected to first busbar-connecting bushings 3a at an upper left section of the switches. In the bus section panel B, three single-phase switches 7 described later herein are arranged in order in parallel to a front door of the panel, in a longitudinal direction of the panel, and the direction of the switches fits to an arranging direction of the busbars 3 of each electrical phase in the feeder panels F1, F2 forming a panel array.

As shown in FIGS. 3 and 4, the feeder panels F1, F2 have a busbar compartment 1a, a switch compartment 1b, a cable compartment 1c, and a control compartment 1d, each of the four compartments being partitioned by a metallic earthing plate 2 disposed inside a housing 1 of the panel. Each feeder panel also has a single-side openable front door 1e on a front side (right side of FIG. 3) of the housing 1, and a removable rear panel 1f on a rear side (left side of FIG. 3) of the housing 1.

The busbar compartment 1a is disposed in an upper region of the housing 1 near-centrally in the longitudinal direction thereof (i.e., a left-right direction of FIG. 4). The switch compartment 1b is disposed below the busbar compartment 1a, and the cable compartment 1c is disposed at the rear side (left side of FIG. 3) of the housing 1. The control compartment 1d is disposed in an upper rear section of the front door 1e and positioned to face the busbar compartment 1a.

Inside the busbar compartment 1a, the solid-insulated busbars 3 for three phases are arranged in parallel to a front panel of the housing 1 (i.e., in a direction orthogonal to the paper of FIG. 3) via busbar-connecting bushings 3c. Each busbar 3, a gas-less conductor electrically insulated with a solid insulator, requires no gas management and thus improves handleability. Additionally, even if dust particles or other unwanted substances enter the busbar compartment 1a, safety is ensured since insulating characteristics are maintained.

The switch compartment 1b contains switches 7 that each include, in the present embodiment, a double-break three-position vacuum switch (double-break three-position circuit breaker/disconnecting switch) 5 and a vacuum earthing switch 6. The switch compartment 1b also contains an operating device 8. The switches 7 are arranged side by side in three rows as viewed from the front of the panel, and one switch 7 is provided for each phase so that three phases are covered.

The cable compartment 1c contains a cable-connecting terminal 20a connecting to a fixed contact point of the double-break three-position vacuum switch (double-break three-position circuit breaker/disconnecting switch) 5 and introduced into the cable compartment 1c. The cable compartment 1c also contains a T-shaped cable head 20 rotatably provided on the cable-connecting terminal 20a, and a cable 9 constructed so that rotating the T-shaped cable head 20 disposes the cable 9 at an upper or lower section of the cable head and connects the cable 9 to the cable-connecting terminal 20a.

The double-break three-position vacuum switch (double-break three-position circuit breaker/disconnecting switch) 5 and vacuum earthing switch 6 arranged in the switch compartment 1b are integrally molded with an epoxy resin to constitute the switch 7. Thus, the switch region is formed into a single unit to implement a compact and lightweight design. The molded switch has an outer surface earthed with an electroconductive coating material to ensure safety of contact.

The double-break three-position vacuum switch 5 has a vacuum container equipped with an insulating tube, two fixed electrodes each housed in the vacuum container, and movable electrodes. These elements constitute a structure having two circuit-breaking points. In this example, the fixed electrodes are arranged at an upper position from the movable electrodes connectible to and disconnectible from these fixed contact points, and the movable electrodes are arranged to take up a lower position from the fixed electrodes.

One of the fixed electrodes in the double-break three-position vacuum switch 5 is disconnectibly connected to one busbar 3 in the busbar compartment 1a via one busbar-connecting bushing 3c disposed to be introducible into the busbar compartment 1a. The other of the fixed electrodes in the double-break three-position vacuum switch 5 is disconnectibly connected to the T-shaped cable head 20 of the cable 9 in the cable compartment 1c via the cable-connecting terminal 20a disposed to be introducible into the cable compartment 1c.

Figure 5:
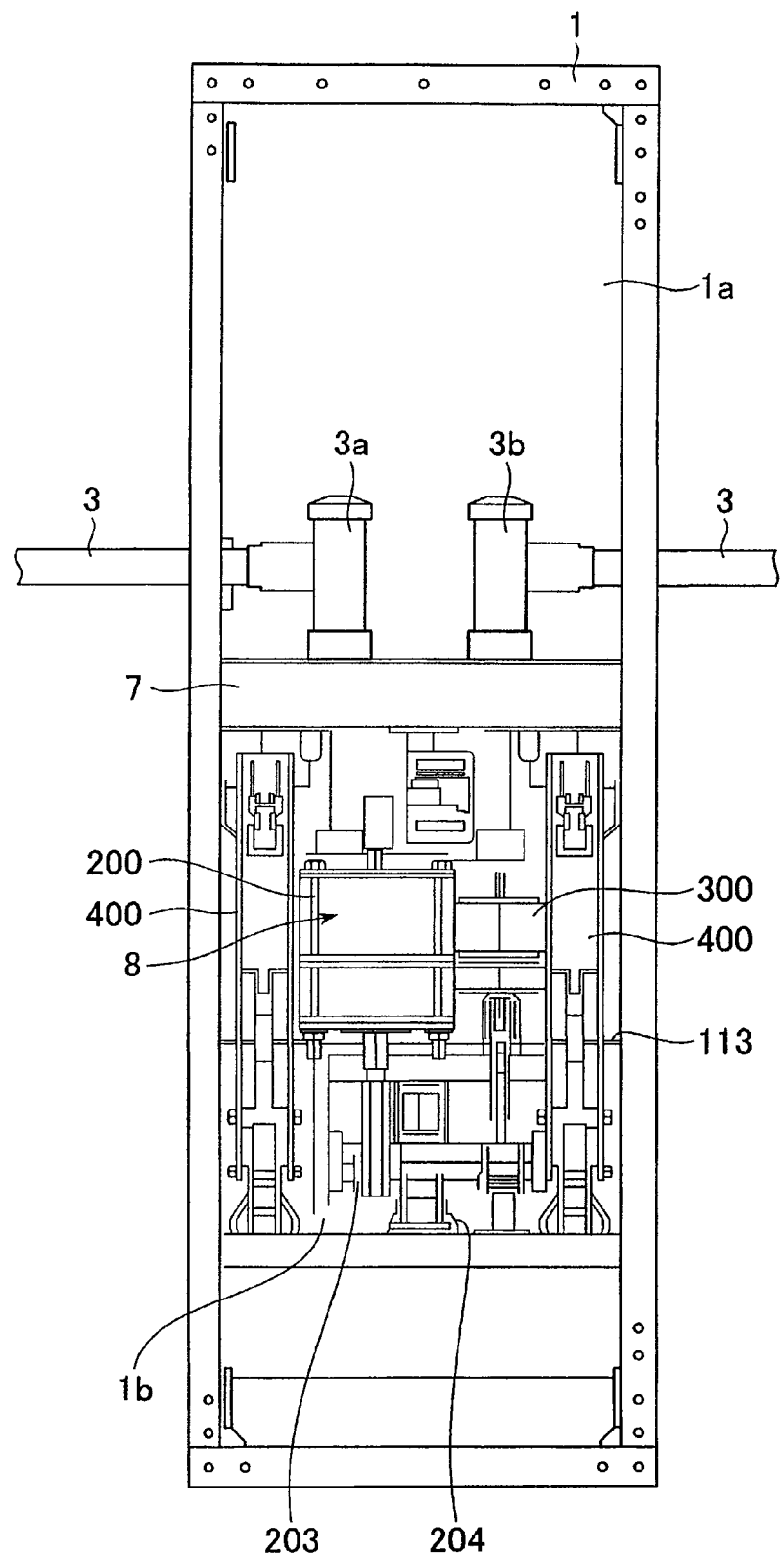
FIG. 5 is an internal front view of the bus section panel forming another part of the vacuum insulated switchgear shown in FIG. 1.
Figure 6:
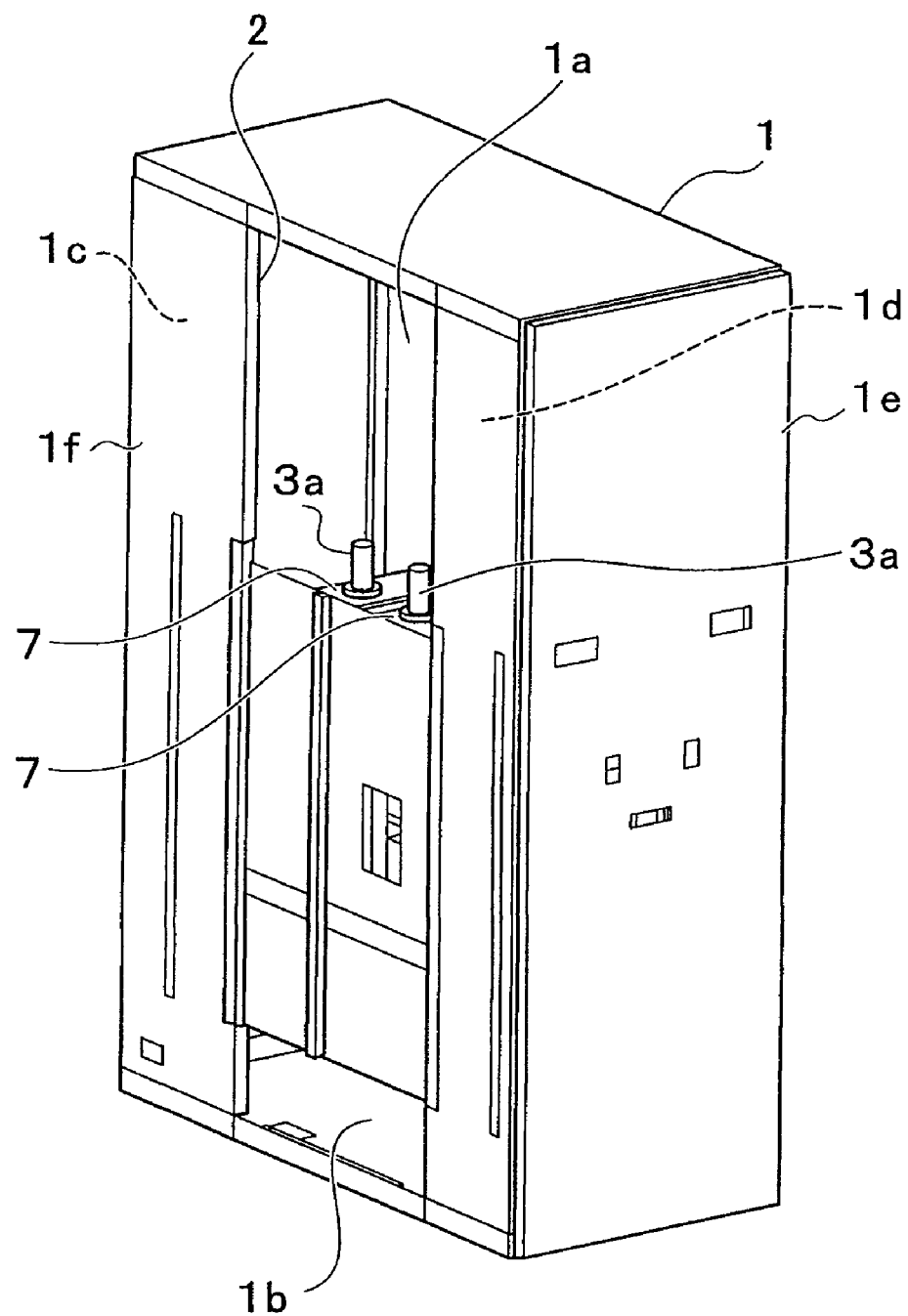
FIG. 6 is a perspective view of the bus section panel of FIG. 5.
Figure 7:
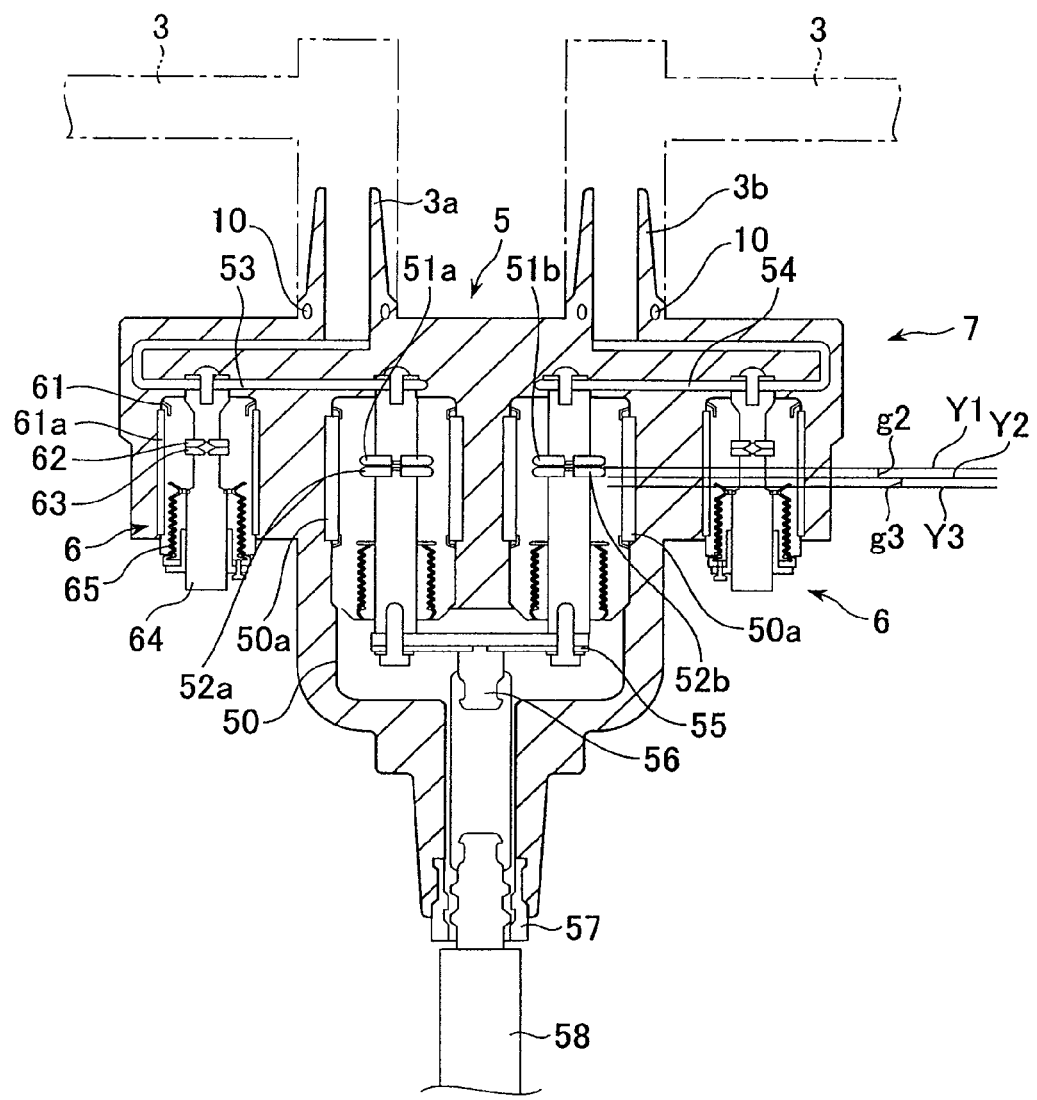
FIG. 7 is a longitudinal side view of a switch forming yet another part of the vacuum insulated switchgear shown in FIG. 5.
Figure 8:
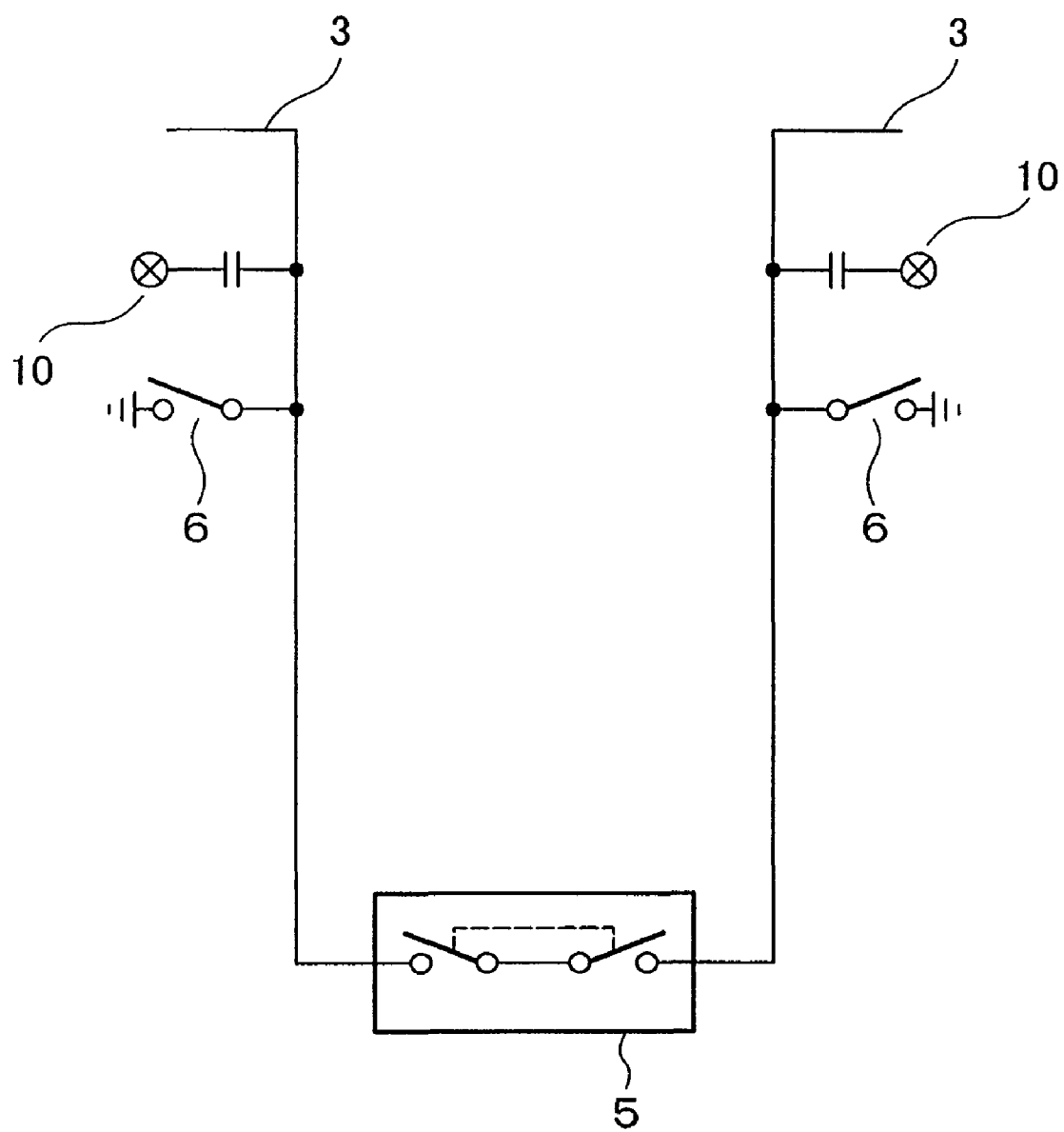
FIG. 8 is a single-line diagram of the vacuum insulated switchgear shown in FIG. 5.
Figure 9:
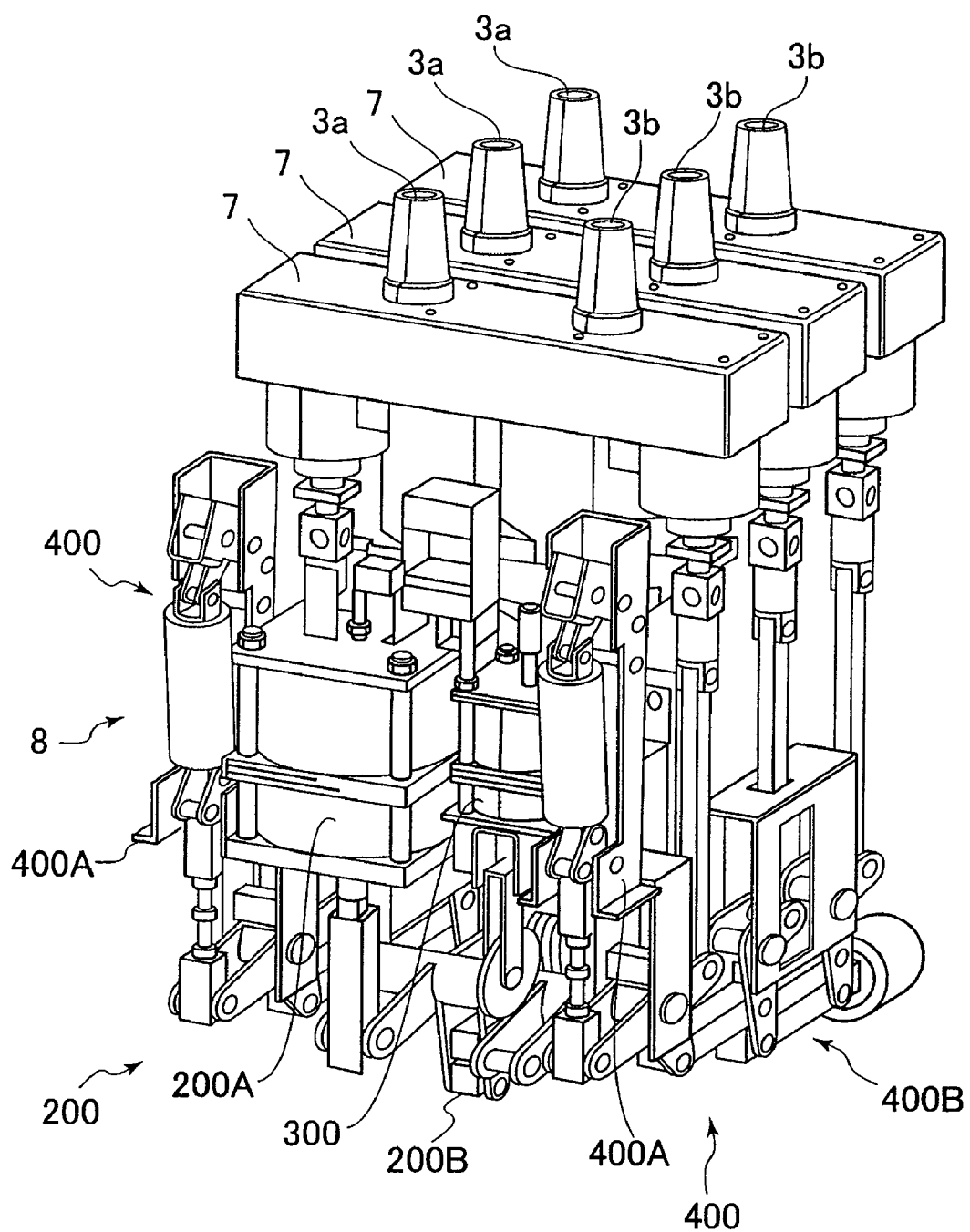
FIG. 9 is a perspective view illustrating the switch of FIG. 7 and an operating device.

Details of the bus section panel B, a constituent element of the vacuum insulated switchgear of the present invention, are described below using FIGS. 5 to 9. FIG. 5 is an internal front view of the bus section panel forming another part of the vacuum insulated switchgear shown in FIG. 1. FIG. 6 is a perspective view of the bus section panel of FIG. 5. FIG. 7 is a longitudinal side view of a switch forming yet another part of the vacuum insulated switchgear shown in FIG. 5. FIG. 8 is a single-line diagram of the vacuum insulated switchgear shown in FIG. 5. FIG. 9 is a perspective view illustrating the switch of FIG. 7 and an operating device. In FIGS. 5 to 9, the constituent elements each assigned the same reference number or symbol as those of FIGS. 1 to 4 are the same elements, and detailed description of these elements is therefore omitted.

As shown in FIGS. 5 and 6, the bus section panel B includes a busbar compartment 1a, a switch compartment 1b, a cable compartment 1c, and a control compartment 1d, each of the four compartments being partitioned by a metallic earthing plate 2 disposed inside a housing 1 of the panel. The panel also has a single-side openable front door 1e on a front side (right side of FIG. 6) of the housing 1, and a removable rear panel 1f on a rear side (left side of FIG. 6) of the housing 1. In FIG. 6, busbars 3 are omitted for the sake of convenience in illustration.

The busbar compartment 1a is disposed in an upper region of the housing 1 near-centrally in a longitudinal direction thereof (i.e., a left-right direction of FIG. 6). The switch compartment 1b is disposed below the busbar compartment 1a, and the cable compartment 1c is disposed at the rear side (left side of FIG. 6) of the housing 1. The control compartment 1d is disposed in an upper rear section of the front door 1e and positioned to face the busbar compartment 1a.

Inside the busbar compartment 1a, a second busbar 3, 3, 3 for each of three phases is extended from the adjacent second feeder panel F2 and connected to the second busbar-connecting bushings 3b, 3b, 3b at the upper right section of the switches 7, 7, 7 detailed later herein. A first busbar 3, 3, 3 for each phase, extended from the first feeder panel F1 is likewise connected to the first busbar-connecting bushings 3a, 3a, 3a at the upper left section of the switches 7, 7, 7.

The switch compartment 1b contains the switches 7 that each include a double-break three-position vacuum switch (double-break three-position circuit breaker/disconnecting switch BDS) 5, a vacuum earthing switch (ES) 6, a voltage detector (VD) 10, first busbar-connecting bushings 3a, and second busbar-connecting bushings 3b. The switch compartment 1b also contains an operating device 8. The double-break three-position vacuum switch (BDS) 5, the vacuum earthing switch (ES) 6, the voltage detector (VD) 10, the first busbar-connecting bushings 3a, and the second busbar-connecting bushings 3b are integrally molded with an epoxy resin as shown in FIG. 7, thereby to constitute the switch 7. Thus, the switch region is formed into a single unit to implement a compact and lightweight design. This unitized switch region is of a phase-separated structure with constituent elements arranged side by side in order in parallel to the front door 1e of the housing 1, in a longitudinal direction of the housing, and with a shielding layer being disposed between the phases so as to suppress a short-circuiting accident from occurring between the phases. The molded switch has an outer surface earthed with an electroconductive coating material to ensure safety of contact.

Next, a detailed configuration of the switch 7 is described below using FIGS. 7 and 8.

As shown in FIG. 7, the switch 7 includes: the double-break three-position vacuum switch (double-break three-position circuit breaker/disconnecting switch) 5 disposed near-centrally in a front view of the housing 1; two vacuum earthing switches 6, 6 arranged at left and right ends of the switch 5; and the first and second busbar-connecting bushings 3a, 3b each cylindrically erected on top of the vacuum earthing switches 6, 6 and having the connected busbars 3, 3 that are extended from the array-constructed left and right feeder panels F1, F2.

The double-break three-position vacuum switch 5 has a vacuum container 50 equipped with two insulating tubes 50a. The vacuum switch 5 also has fixed contact points 51a, 51b housed in the insulating tubes 50a, 50a, respectively, and movable contact points 52a, 52b connectible to and disconnectible from each of the fixed contact points 51a, 51b. The two fixed contact points 51a, 51b and the two movable contact points 52a, 52b constitute two circuit-breaking points.

The fixed contact point 51a on the left side of FIG. 7 is connected to the first busbar 3 via a conductor 53 and the first busbar-connecting bushings 3a. The fixed contact point 51b on the right side of FIG. 7 is connected to the second busbar 3 via a conductor 54 and the second busbar-connecting bushings 3b.

The movable contact points 52a and 52b, on the other hand, are coupled to each other via a movable conductor 55 reinforced by stainless steel or any other metal that is not annealed at high temperature. A vacuum insulated operating rod 56 is coupled to the movable conductor 55. The vacuum insulated operating rod 56 is led out from the vacuum container 50 and coupled to an operating rod 58. The operating rod 58 is coupled to an operating rod 81 actuated by the operating device 8. Also, a guide 57 is provided to fix a position of the vacuum insulated operating rod 56 and hence to prevent misalignment of the movable contact points 52a, 52b and the fixed contact points 51a, 51b.

In addition, as shown in FIG. 7, the two movable contact points 52a and 52b, are actuated by the operating rod 58 to stop at either a closing position Y1 for energizing, an opening position Y2 for circuit breaking to cut off a current, or a circuit-disconnecting position Y3 for ensuring safety for inspection persons against a surge voltage due to lightning.

As shown in FIG. 7, the movable contact points 52a and 52b each gain a cutoff gap "g2" at the opening position Y2 and a disconnecting gap "g3" at the disconnecting position Y3. The disconnecting gap "g3" is preset to have an interpolar clearance equivalent to nearly twice the cutoff gap "g2". In this way, the plurality of (in the present example, two) movable contact points each with the disconnecting gap "g3" preset to be nearly twice the cutoff gap "g2" enable multilevel insulation.

Next, a detailed configuration of the vacuum earthing switches 6 is described below using FIGS. 7 and 8.

As shown in FIG. 7, each vacuum earthing switch 6 includes a vacuum container 61 equipped with an insulating tube 61a. The switch also has a fixed contact point 62 housed in the vacuum container 61 and connected to the conductor 53 or 54, and a movable contact point 63 connectible to and disconnectible from the fixed contact point 62. A movable conductor 64 is coupled to the movable contact point 63. The movable conductor 64 is led out from the vacuum container 61 via metallic bellows 65 and coupled to an insulated operating rod 82 for the earthing switch.

The fixed contact point 62 of the vacuum earthing switch 6 on the left side of FIG. 7 is connected to the first busbar 3 via the conductor 53 and the first busbar-connecting bushings 3a, and the fixed contact point 62 of the vacuum earthing switch 6 on the right side of FIG. 7 is connected to the second busbar 3 via the conductor 54 and the second busbar-connecting bushings 3b.

FIG. 8 shows an electric circuit of the present embodiment applying the vacuum insulated switchgear of the present invention as the bus section panel. As shown in FIGS. 7 and 8, the switchgear is configured so that the configuration of the switch 7 and an electric circuit of the bus section panel can be readily recognized from the front of the panel. Thus, which busbar section is electrically charged can be readily identified from the front and no mistakes are likely to occur during operations. In addition, it is clear whether the internal constituent elements of the panel are charged.

The operating device 8 is used to turn on and off the vacuum earthing switch 6 as well as to select either the closing position Y1 for energizing, the opening position Y2 for cutting off a load current or an on-accident or on-fault current, or the disconnecting position Y3 for ensuring safety for the inspection persons against a surge voltage due to lightning, in the double-break three-position vacuum switch 5. Next, a detailed configuration of the operating device 8 is described below using FIGS. 5 and 9.

As shown in FIGS. 5 and 9, constituent parts of the operating device 8 are fixed to a supporting plate 113 provided inside the switch compartment 1b. Also, the operating device 8 is constructed essentially of a first operating mechanism 200 for switching the movable contact points 52a, 52b of the double-break three-position vacuum switch 5 to the closing position Y1 or the opening position Y2, a second operating mechanism 300 for switching the movable contact points 52a, 52b of the double-break three-position vacuum switch 5 to the opening position Y2 or the disconnecting position Y3, and third operating mechanisms 400, 400 for operating the movable contact points 63 of the two vacuum earthing switches 6. In FIG. 9, the supporting plate 113 is omitted for illustration-associated reasons.

The first operating mechanism 200 includes an operating unit 200A that drives an operating mechanism of the double-break three-position vacuum switch 5 for a first phase, and a linking unit 200B that drives operating mechanisms of the double-break three-position vacuum switches 5 for a second phase and a third phase. The third operating mechanism 400 includes an operating unit 400A that drives an operating mechanism of the vacuum earthing switch 6 for the first phase, and a linking unit 400B that drives operating mechanisms of the vacuum earthing switches 6 for the second phase and the third phase.

Figure 10:
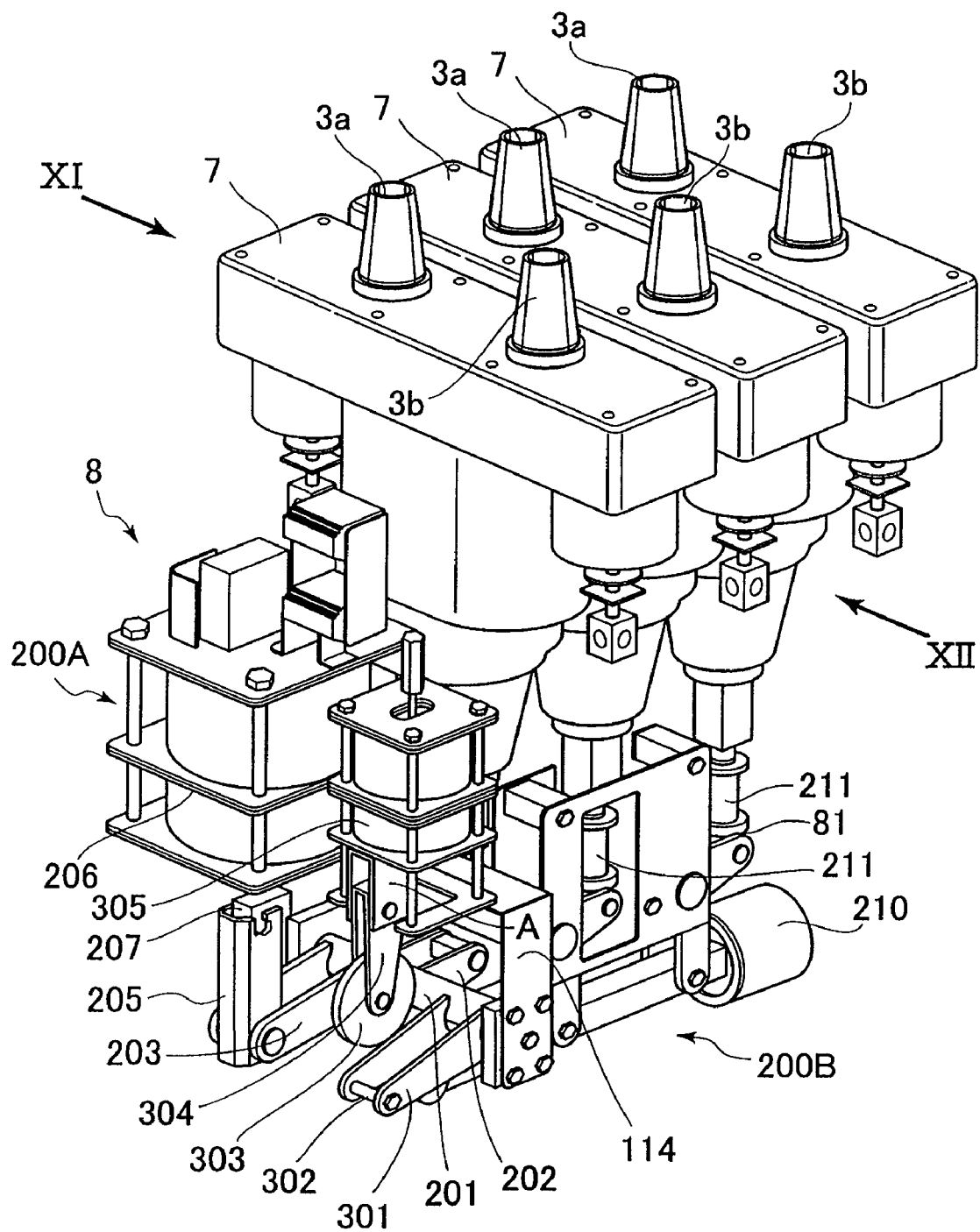
FIG. 10 is a perspective view illustrating the switch of FIG. 9 and a first operating mechanism and second operating mechanism of the operating device in FIG. 9.
Figure 11:
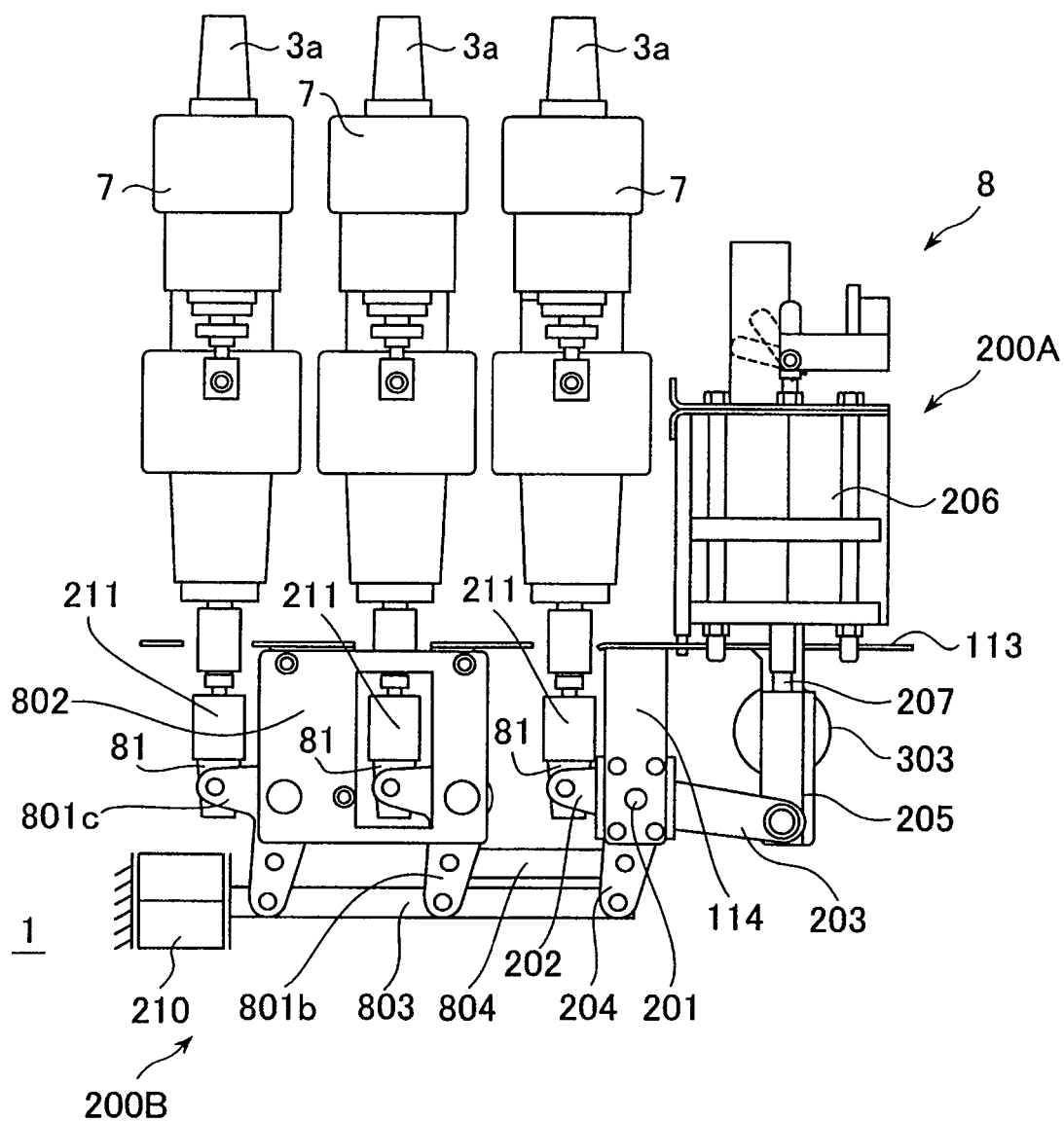
FIG. 11 is a side view that illustrates the first operating mechanism and second operating mechanism of the operating device and vacuum switch in the vacuum insulated switchgear existing when viewed from a direction of arrow-marked line XI in FIG. 10.
Figure 12:
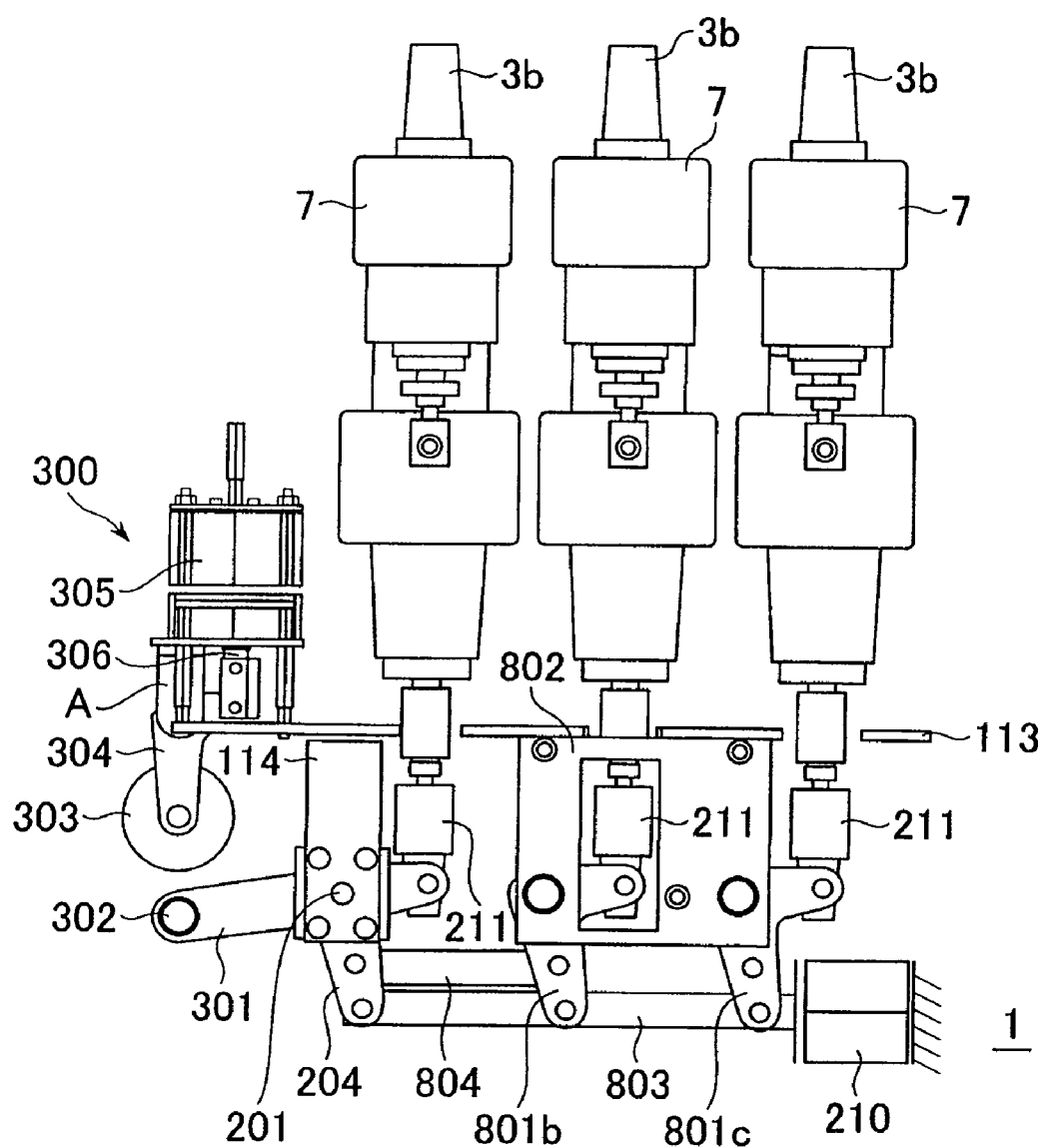
FIG. 12 is a side view that illustrates the second operating mechanism of the operating device and switch in the vacuum insulated switchgear existing when viewed from a direction of arrow-marked line XII in FIG. 10.

The configuration of the operating unit 200A in the first operating mechanism 200 is described below using FIGS. 9 to 12. FIG. 10 is a perspective view that illustrates the first operating mechanism and second operating mechanism of the operating device and switches forming a part of the vacuum insulated switchgear shown in FIG. 9. FIG. 11 is a side view that illustrates the first operating mechanism and second operating mechanism of the operating device and switches in the vacuum insulated switchgear existing when viewed from a direction of arrow-marked line XI in FIG. 10. FIG. 12 is a side view that illustrates the second operating mechanism of the operating device and switches in the vacuum insulated switchgear existing when viewed from a direction of arrow-marked line XII in FIG. 10. In FIGS. 10 to 12, the constituent elements each assigned the same reference number or symbol as those of FIGS. 1 to 9 are the same elements, and detailed description of these elements is therefore omitted. For illustration-associated reasons, in FIG. 10, the supporting plate 113 and the third operating mechanism 400 are omitted and in FIGS. 11 and 12, the third operating mechanism 400 is omitted.

As shown in FIG. 10, a first-shaft supporting member 114 of a nearly U-shaped rectangular form is fixed to a supporting plate 113 not shown, with an open end of the member 114 being directed downward. The first-shaft supporting member 114 supports a first shaft 201 so as to make the shaft pivotal in a direction parallel to the front door 1e of the housing 1. A lever 202 is fixed to one side near-centrally in an axial direction of the first shaft 201. The lever 202 is coupled at its leading end to the operating rod 81 of the switch 7 for the first phase. At one side of one axial end of the first shaft 201, a lever 203 is fixed in an opposite direction relative to the lever 202. Additionally, below the nearly central region in the axial direction of the first shaft 201, a lever 204 is fixed in a visually axial direction of nearly 90 degrees with respect to the lever 202, and the lever 204 is coupled to the linking unit 200B described later herein.

As shown in FIGS. 10 and 11, a driving shaft 207 for an electromagnet 206 is coupled to the lever 203 via a coupling member 205, with a movable core (not shown) fixed to the driving shaft 207. The electromagnet 206 has a fixed core secured to the supporting plate 113, around the movable core, and a coil and a permanent magnet are disposed inside the fixed core.

The electromagnet 206 is designed so that when the movable contact points 52a, 52b are retained in the closing position Y1, attraction force of the coil and permanent magnet creates hold force that opposes stored biasing force of a tripping spring 210 (described later herein) and a contact-pressure spring 211 provided at one end of the operating rod 81.

Next, the configuration of the second operating mechanism 300 for switching the movable contact points 52a, 52b of the double-break three-position vacuum switch 5 to the opening position Y2 or the disconnecting position Y3 is described below using FIGS. 10 and 12. As shown in FIGS. 10 and 12, a lever 301 is fixed to the other side of the other end of the first shaft 201 in the axial direction thereof, and the lever 301 has an interlocking pin 302 at one end of the lever 301. A roller 303 abuts the pin 302, and the roller 303 is rotatably provided at one end of a crank lever 304 in one direction thereof. The crank lever 304 is pivotally supported by a mounting fixture A.

A driving shaft 306 for an electromagnet 305 is coupled to one end of the crank lever 304 at the other side thereof, and a movable core (not shown) is fixed to the driving shaft 306. The electromagnet 305 has a fixed core (not shown) that is secured to the supporting plate 113, around the movable core, and two coils are disposed at upper and lower positions inside the fixed core.

The electromagnet 305 energizes the upper and lower coils to actuate the movable core vertically, whereby the crank lever 304 is turned. This turning motion of the crank lever 304 changes an abutting position between the interlocking pin 302 and the roller 303. As a result, the lever 203 can be controlled at a predetermined position so that the lever is stopped from turning about the first shaft 201 or not to be so stopped.

This renders the movable contact points 52a, 52b of the double-break three-position vacuum switch 5 controllable to be stopped from moving from the opening position Y2 shown in FIG. 7, to the disconnecting position Y3, and thus to be maintained in the opening position Y2, or controllable to be movable from the opening position Y2 to the disconnecting position Y3. That is to say, this structure serves as an interlock mechanism between the opening position Y2 and disconnecting position Y3 in the movable contact points 52a, 52b of the double-break three-position vacuum switch 5.

Next, the linking unit 200B that links the switch contact operation of the double-break three-position vacuum switch 5 for the first phase to the double-break three-position vacuum switches 5 for the second and third phases is described below using FIGS. 10 and 11.

As shown in FIGS. 10 and 11, the linking unit 200B includes: a crank lever 801b coupled at one end thereof to the operating rod 81 of the double-break three-position vacuum switch 5 for the second phase; a crank lever 801c coupled at one end thereof to the operating rod 81 of the double-break three-position vacuum switch 5 for the third phase; a first bracket 802 fixed to the supporting plate 113 in order to support nearly central sections of both crank levers 801b and 801c pivotally and axially; a first coupling member 803 having one end that is pin-coupled to one end of the lever 204, and the other end pressed against the housing 1 via the tripping spring 210, thereby to couple one end of each crank lever 801b, 801c, at the other side of each, to respective desired sections; and a second coupling member 804 that couples an intermediate section of the lever 204 and an intermediate section on the other side of the crank lever 801b. The first coupling member 803 and the second coupling member 804 are, as shown in FIG. 11, arranged in the longitudinal direction of the housing 1, at a lower side of the switch 7.

Figure 13:
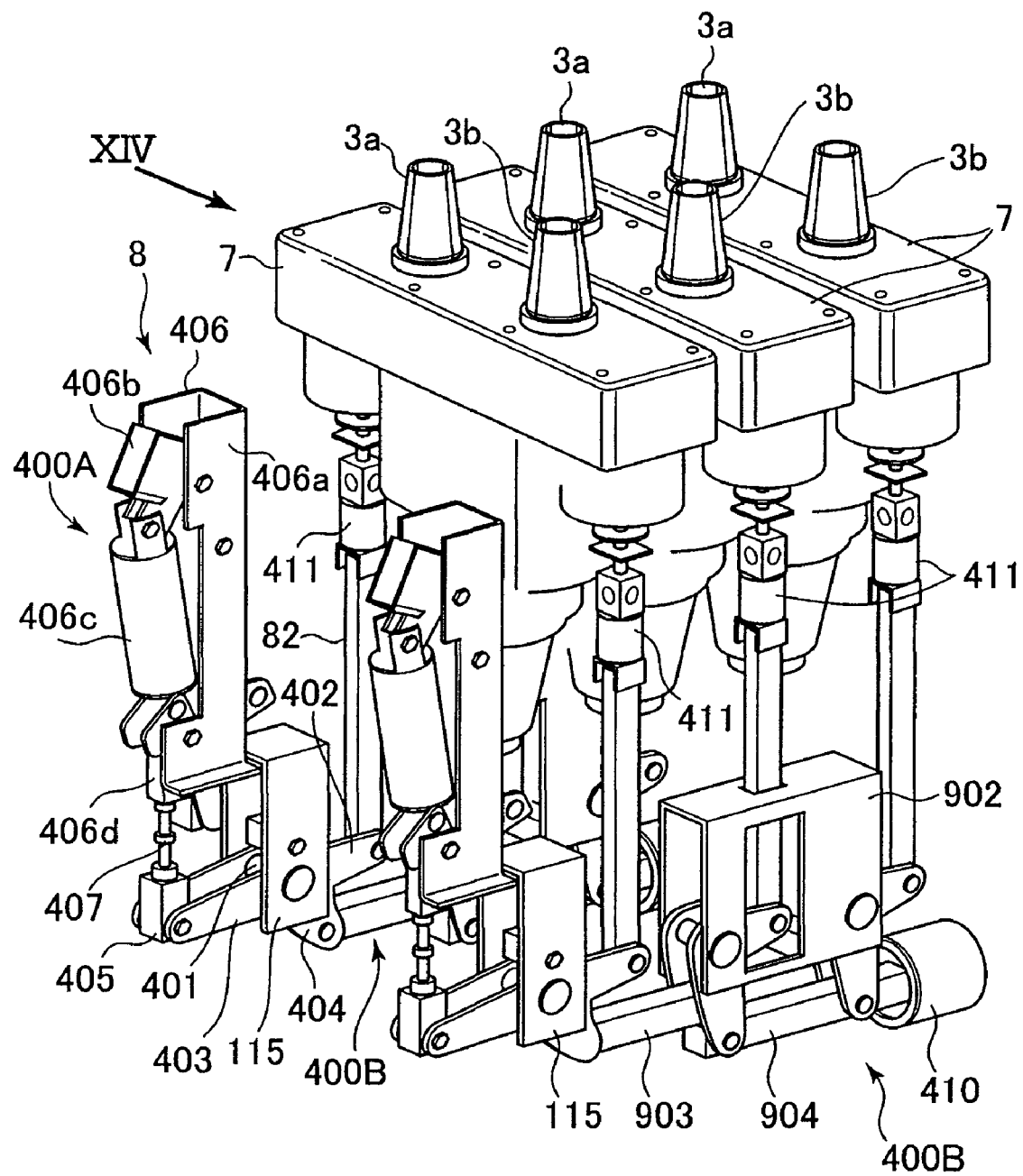
FIG. 13 is a perspective view that illustrates the switch of FIG. 9 and a third operating mechanism of the operating device in FIG. 9.
Figure 14:
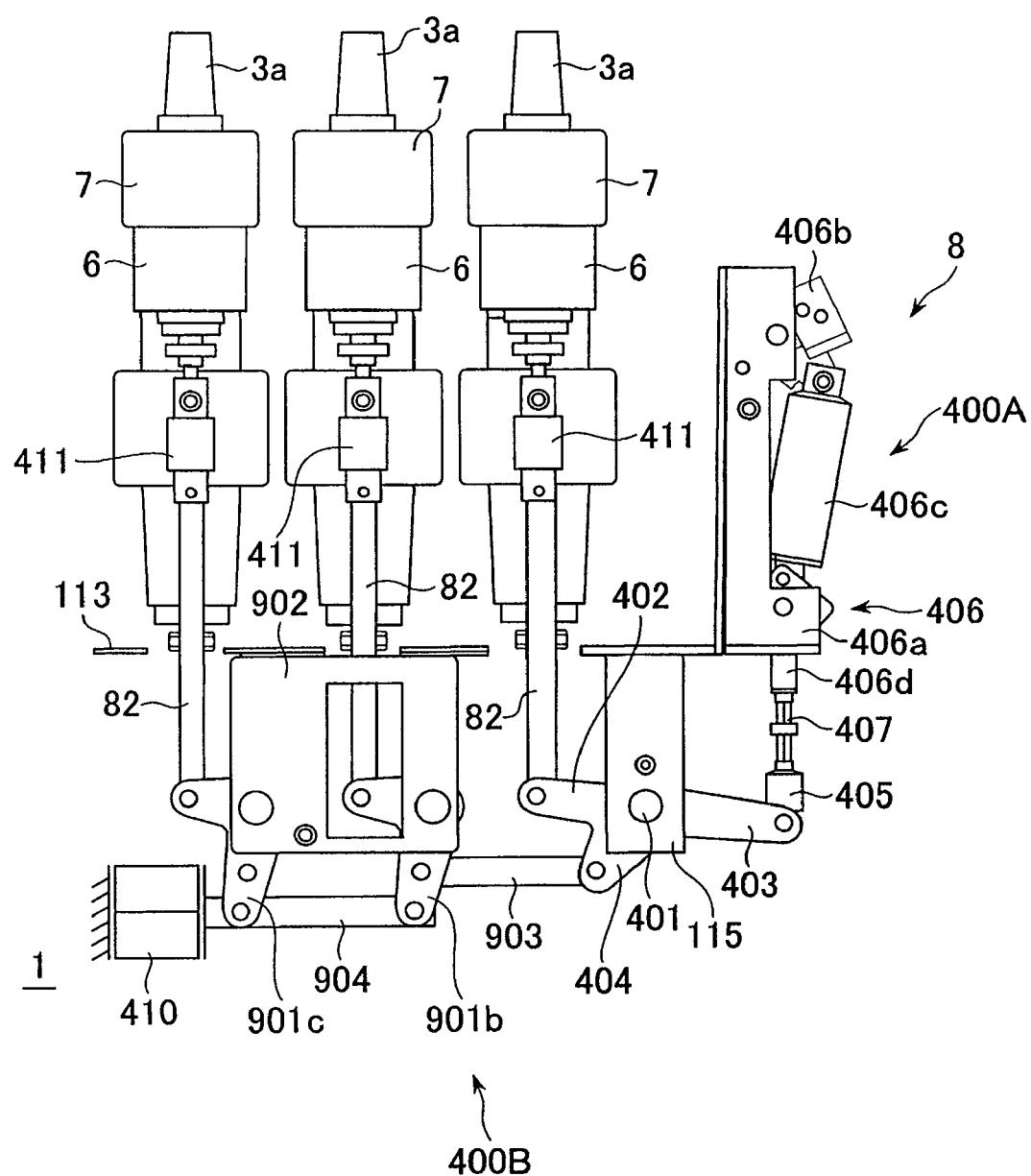
FIG. 14 is a side view that illustrates the third operating mechanism of the operating device and switch in the vacuum insulated switchgear existing when viewed from a direction of arrow-marked line XIV in FIG. 13.

Next, the configuration of the operating unit 400A of the third operating mechanism 400 which operates the movable contact point 63 of the vacuum earthing switch 6 is described below using FIGS. 9, 13, and 14. FIG. 13 is a perspective view that illustrates the third operating mechanism of the operating device and switch forming a part of the vacuum insulated switchgear shown in FIG. 9. FIG. 14 is a side view that illustrates the third operating mechanism of the operating device and switch in the vacuum insulated switchgear existing when viewed from the direction of arrow-marked line XIV in FIG. 13. In FIGS. 13 and 14, the constituent elements each assigned the same reference number or symbol as those of FIGS. 1 to 12 are the same elements, and detailed description of these elements is therefore omitted. For illustration-associated reasons, in FIG. 13, the supporting plate 113 and the first and second operating mechanisms 200, 300 are omitted and in FIG. 14, the first and second operating mechanisms 200, 300 are omitted. In addition, the following description relates to the operating unit 400A associated with the vacuum earthing switch 6 on the left side of FIG. 9, and the operating unit 400A for the vacuum earthing switch 6 on the right side of FIG. 9 is likewise constructed.

As shown in FIGS. 13 and 14, a second bracket 115 of a nearly U-shaped rectangular form is fixed to the supporting plate 113, with an open end of the bracket 115 being directed downward. The second bracket 115 supports a second shaft 401 so as to make the shaft 401 pivotal in a direction parallel to the front door 1e of the housing 1. A lever 402 is fixed to one side near-centrally in an axial direction of the second shaft 401. The lever 402 is coupled at its leading end to the insulated operating rod 82 of the vacuum earthing switch 6 for the first phase. At the other side of the second shaft 401 near-centrally in the axial direction thereof, a lever 403 is fixed in an opposite direction relative to the lever 402. Additionally, below the nearly central region in the axial direction of the second shaft 401, a lever 404 is fixed in a visually axial direction of nearly 90 degrees with respect to the lever 402, and the lever 404 is coupled to the linking unit 400B described later herein.

As shown in FIGS. 13 and 14, a driving shaft 407 for an operational driving unit 406 is coupled to the lever 403 via a coupling member 405. The operational driving unit 406 includes: a driving unit bracket 406a fixed to the supporting plate 113; a handle insertion member 406b pivotally provided at an upper front side of the driving unit bracket 406a and constructed so that a handle is inserted into an insertion opening during operations; a driving spring 406c pivotally coupled to a lower section of the handle insertion member 406b, having a body of the spring stored into the driving unit bracket 406a by pivoting of the handle insertion member 406b, and pushing an internal cylinder downward by, for example, pressing the spring provided inside; and a coupling member 406d that couples the driving spring 406c and the driving shaft 407 together. The driving spring 406c has a lower section axially supported by the driving unit bracket 406a so as to be pivotal.

The operational driving unit 406 is designed so that when the movable contact point 63 is retained in the closing position Y1, the driving spring 406c is mechanically latched to provide a hold force that opposes stored biasing force of a tripping spring 410 (described later herein) and a contact-pressure spring 411 provided at a proximal end of the insulated operating rod 82.

Next, the linking unit 400B that links the switch contact operation of the vacuum earthing switch 6 for the first phase to the vacuum earthing switches 6 for the second and third phases is described below using FIGS. 13 and 14. The following description relates to the linking unit 400B associated with the vacuum earthing switch 6 on the left side of FIG. 9, and the linking unit 400B for the vacuum earthing switch 6 on the right side of FIG. 9 is likewise constructed.

As shown in FIG. 14, the linking unit 400B includes: a crank lever 901b coupled at one end thereof to the insulated operating rod 82 of the vacuum earthing switch 6 for the second phase; a crank lever 901c coupled at one end thereof to the insulated operating rod 82 of the vacuum earthing switch 6 for the third phase; a third bracket 902 fixed to the supporting plate 113 in order to support nearly central sections of both crank levers 901b and 901c pivotally and axially; a first coupling member 903 that is pin-coupled at one end thereof to one end of the lever 404 and coupled at the other end to an intermediate portion at the other end of the crank lever 901b; and a second coupling member 904 that is pin-coupled at one end thereof to one end of the crank lever 901b and pressed at the other end firmly against the housing 1 via the tripping spring 410, thereby to couple one end of the crank lever 901c, at the other side of the lever, to a desired section. The first coupling member 903 and the second coupling member 904 are, as shown in FIG. 13, arranged in the longitudinal direction of the housing 1, at the lower side of the switch 7.

Operation of each double-break three-position vacuum switch 5 in the present embodiment applying the vacuum insulated switchgear of the present invention as the bus section panel, is described below using FIGS. 7 to 12.

Under the state that the movable contact points 52a, 52b of the double-break three-position vacuum switch 5 are set to match the opening position Y2, elongation force of the tripping spring 210 in the linking unit 200B of the first operating mechanism 200 is transmitted to the lever 203 via the first coupling member 803 and the second coupling member 804. This results in a counterclockwise torque being imparted to the lever 203 with the first shaft 201 as a fulcrum.

This counterclockwise torque causes the interlocking pin 302 at one end of the lever 301, a constituent element of the second operating mechanism 300, to abut an outer peripheral lower surface of the roller 303. This means inhibiting the movement from the opening position Y2 for cutting off the load current or the on-accident or on-fault current to the disconnecting position Y3 for ensuring safety for the inspection persons against a surge voltage due to lightning.

Next, switching from the opening position Y2 to the closing position Y1 by the first operating mechanism 200 is described below.

Energizing the coil of the electromagnet 206 in the first operating mechanism 200 moves the driving shaft 207 downward in FIG. 11. This downward movement of the driving shaft 207 pivots the lever 203 in a clockwise direction of FIG. 11 with the first shaft 201 as a fulcrum, thus pivoting the lever 202 upward in FIG. 11 and the lever 204 in a left direction of FIG. 11. Since, as described above, the operating rod 81 of the double-break three-position vacuum switch 5 for the first phase is coupled to the lever 202, the turn of the lever 202 moves the operating rod 81 upward, consequently moving the movable contact points 52a, 52b towards the closing position Y1.

Meanwhile, since the lever 204 to which the first coupling member 803 and second coupling member 804 of the linking unit 200B are coupled together turns in a left direction of FIG. 11, the crank levers 801b, 801c each coupled at the other end thereof to the coupling members 803, 804 rotate clockwise in FIG. 11. As described above, the operating rod 81 of the double-break three-position vacuum switch 5 for the second phase is coupled to the crank lever 801b, and the operating rod 81 of the double-break three-position vacuum switch 5 for the third phase is coupled to the crank lever 801c, so when the crank levers 801b, 801c pivot, the respective operating rods 81, 81 move upward. This, in turn, moves the respective movable contact points 52a, 52b of the double-break three-position vacuum switches 5 for the second and third phases, towards the closing position Y1.

Under this closed state, the tripping spring 210 and the contact-pressure springs 211, 211, 211 are biased to be ready for contact-parting operation.

Next, the contact-parting operation of the first operating mechanism 200, that is, switching from the closing position Y1 to the opening position Y2, is described below.

When the coil of the electromagnet 206 in the first operating mechanism 200 is energized in a direction opposite to the contact-closing operation so as to cancel magnetic fluxes of the permanent magnet, the stored biasing force of the tripping spring 210 and contact-pressure springs 211, 211, 211 moves the driving shaft 207 upward in FIGS. 11 and 12. This upward movement of the driving shaft 207 pivots the lever 301 clockwise in FIG. 12, via the lever 203 and the first shaft 201, but the clockwise pivoting of the lever 301 is suppressed to a predetermined level by consequential abutting between the interlocking pin 302 in the second operating mechanism 300 and the outer peripheral lower surface of the roller 303 in the mechanism 300. As a result, the pivoting of the lever 202 to which the operating rod 81 of the double-break three-position vacuum switch 5 for the first phase is coupled is suppressed to a predetermined level. The movable contact points 52a, 52b of the double-break three-position vacuum switch 5 can therefore be retained in the opening position Y2.

In addition, since the pivoting of the lever 204 is likewise suppressed to a predetermined level, the pivoting of each of the crank levers 801b, 801c to which the operating rods 81 of the double-break three-position vacuum switches 5 for the second and third phases are coupled is suppressed to a predetermined level. The respective movable contact points 52a, 52b of the double-break three-position vacuum switches 5 for the second and third phases can therefore be retained in the opening position Y2.

Next, circuit disconnection by the second operating mechanism 300, that is, switching from the opening position Y2 to the disconnecting position Y3, is described below.

When the double-break three-position vacuum switch 5 is open, energizing the upper coil of the electromagnet 305 in the second operating mechanism 300 moves the driving shaft 306 downward. This downward movement of the driving shaft 306 pivots the roller 303 clockwise in FIG. 12, via the crank lever 304. The clockwise pivoting of the roller 303 moves the abutting position of the interlocking pin 302 upward with respect to the roller 303. Thus, the operating rod 81 of the double-break three-position vacuum switch 5 for the first phase moves further downward via the lever 301, the first shaft 201, and the lever 202, with the result that the movable contact points 52a, 52b move to the disconnecting position Y3.

Meanwhile, since the lever 204 to which the first coupling member 803 and second coupling member 804 of the linking unit 200B are coupled together turns in a right direction of FIG. 11, the crank levers 801b, 801c each coupled at the other end thereof to the coupling members 803, 804 rotate counterclockwise in FIG. 11. As described above, the operating rod 81 of the double-break three-position vacuum switch 5 for the second phase is coupled to the crank lever 801b, and the operating rod 81 of the double-break three-position vacuum switch 5 for the third phase is coupled to the crank lever 801c, so when the crank levers 801b, 801c pivot, the respective operating rods 81, 81 move downward. This, in turn, moves the respective movable contact points 52a, 52b of the double-break three-position vacuum switches 5 for the second and third phases, towards the disconnecting position Y3.

Next, operation of one vacuum earthing switch 6 in the present embodiment applying the vacuum insulated switchgear of the present invention as the bus section panel, is described below using FIGS. 7, 9, 13, and 14.

FIGS. 13 and 14 show a state in which the movable contact point 63 of the vacuum earthing switch 6 is set to the closing position. Under this closed state, the tripping spring 410 and the contact-pressure springs 411, 411, 411 are biased to be ready for contact-parting operation.

First, switching from the closing position to the opening position by the third operating mechanism 400, that is, the contact-parting operation, is described below. Mechanical latching of the driving spring 406c is released by inserting one end of the handle (not shown) into the insertion opening of the handle insertion member 406b of the operational driving unit 406 and then turning the handle clockwise in FIG. 14, so that the driving shaft 407 moves upward in FIGS. 13 and 14 by stored biasing force of the tripping spring 410 and the contact-pressure springs 411, 411, 411. The upward movement of the driving shaft 407 pivots the lever 403 in a counterclockwise direction of FIG. 14 with the second shaft 401 as a fulcrum, thus pivoting the lever 402 downward in FIG. 14 and the lever 404 in a right direction of FIG. 14. As described above, the insulated operating rod 82 of the vacuum earthing switch 6 for the first phase is coupled to the lever 402, so when the lever 402 pivots, the insulated operating rod 82 moves downward, which then results in the movable contact point 63 moving in the direction of the opening position.

Meanwhile, since the lever 404 to which the first coupling member 903 and second coupling member 904 of the linking unit 400B are coupled together turns in a rightward direction of FIG. 14, the crank levers 901b, 901c each coupled at the other end thereof to the coupling members 903, 904 rotate counterclockwise in FIG. 14. As described above, the insulated operating rod 82 of the vacuum earthing switch 6 for the second phase is coupled to the crank lever 901b, and the insulated operating rod 82 of the vacuum earthing switch 6 for the third phase is coupled to the crank lever 901c, so when the crank levers 901b, 901c pivot, the respective insulated operating rods 82, 82 move downward. This, in turn, moves the respective movable contact points 63, 63 of the vacuum earthing switches 6 for the second and third phases, towards the opening position.

Next, switching from the opening position to the closing position by the third operating mechanism 400, that is, the contact-closing operation is described below. Mechanically latching the driving spring 406c by inserting one end of the handle into the insertion opening of the handle insertion member 406b of the operational driving unit 406 and then turning the handle counterclockwise in FIG. 14 moves the driving shaft 407 downward in FIGS. 13 and 14. The downward movement of the driving shaft 407 pivots the lever 403 in the clockwise direction of FIG. 14 with the second shaft 401 as the fulcrum, thus pivoting the lever 402 upward in FIG. 14 and the lever 404 in a left direction of FIG. 14. As described above, the insulated operating rod 82 of the vacuum earthing switch 6 for the first phase is coupled to the lever 402, so when the lever 402 pivots, the insulated operating rod 82 moves upward, which then results in the movable contact point 63 moving in the direction of the closing position.

Meanwhile, since the lever 404 to which the first coupling member 903 and second coupling member 904 of the linking unit 400B are coupled together turns in a leftward direction of FIG. 14, the crank levers 901b, 901c each coupled at the other end thereof to the coupling members 903, 904 rotate clockwise in FIG. 14. As described above, the insulated operating rod 82 of the vacuum earthing switch 6 for the second phase is coupled to the crank lever 901b, and the insulated operating rod 82 of the vacuum earthing switch 6 for the third phase is coupled to the crank lever 901c, so when the crank levers 901b, 901c pivot, the respective insulated operating rods 82, 82 move upward. This, in turn, moves the respective movable contact points 63, 63 of the vacuum earthing switches 6 for the second and third phases, towards the closing position.

In the above-described embodiment of the vacuum insulated switchgear of the present invention, the bus section panel B has busbar-connecting bushings arranged at the upper left and right sides of each switch 7 existing when viewed from the front, and one or more panels as the feeder panel F1/F2 array are arranged at the left and right of the bus section panel. Since the bus section panel and the feeder panel array constitute the vacuum insulated switchgear, the section of the busbars 3 can be readily recognized from the panel front. This, in turn, simplifies the connection routes of the busbars 3. A vacuum insulated switchgear improved in working efficiency of internal inspection of the bus section panel B as well as its busbar connection, and operational convenience under normal operating conditions, can be provided as a result.

In addition, in the present embodiment of the invention, since three single-phase switches 7 are arranged in order side by side in parallel to the front door 1e of the housing 1, in the longitudinal direction of the housing, the direction of the switches fits to an arranging direction of the busbars 3 for each electrical phase, extended from the feeder panels F1, F2 forming the panel array. Consequently, between the bus section panel B and the feeder panels F1, F2, the busbars for each phase can be connected in parallel to one another in the lateral direction of the panel, and arranged without interference between one busbar and any other busbar.

Furthermore, in the present embodiment of the invention, since a double-break three-position vacuum switch 5 is disposed near-centrally in front view of each switch 7 and since two vacuum earthing switches 6, 6 are arranged at the left and right of the double-break three-position vacuum switch 5, the positions of the vacuum earthing switches 6 corresponding to the busbars 3 extended from the left and right feeder panels formed as the panel array can be recognized easily and clearly. As a result, earthing the first left busbar 3, for example, requires operating the left vacuum earthing switch 6, so that a risk due to erroneously earthing the second right busbar 3, for example, is reduced. Additionally, since the first and second busbars 3, 3 at the left and right sides are sectionalized at each double-break three-position vacuum switch 5, the connection states of the busbars 3, 3 can be readily judged at a glance.

Furthermore, in the present embodiment of the invention, since the third operating mechanism 400, 400 for operating the movable contacts 63 of the vacuum earthing switches 6 arranged at the left and right sides of the switch 7 are of the same construction, operating methods and maintenance items can be unified for improved working efficiency. Additionally, the layout of the third operating mechanisms 400, 400 at the front side of the panel further improves working efficiency since the vacuum earthing switches 6 can be operated from the panel front.

Furthermore, in the present embodiment of the invention, three single-phase switches 7 are arranged in order side by side in parallel to the front door 1e of the housing 1, in the longitudinal direction of the housing. Also, the operating unit 200A of the first operating mechanism 200 and the second operating mechanism 300 for operating the movable contact points 52a, 52b of the double-break three-position vacuum switch 5, and the operating unit 400A of the third operating mechanism 400 for operating the movable contact point 63 of the vacuum earthing switch 6, are arranged between the switch 7 and the front door 1e. Additionally, the linking unit 200B that drives the operating mechanisms of the double-break three-position vacuum switches 5 for the second and third phases, and the linking unit 400B that drives the operating mechanisms of the vacuum earthing switches 6 for the second and third phases are disposed in the longitudinal direction of the housing 1. Width of the housing 1 can therefore be reduced and thus the vacuum insulated switchgear can be made more compact.

What is claimed is:

1. A vacuum insulated switchgear comprising:
a housing enclosing a control compartment, a switch compartment, and a busbar compartment, each of the three compartments being partitioned by a metallic earthing plate;
a circuit-breaking/disconnecting switch region provided in the switch compartment;
an operating device for the switch region;
two sets of earthing switch regions provided in the switch compartment;
an operating device for each of the earthing switch regions;
a first busbar and a second busbar extended from an adjacent panel, in the busbar compartment; and a first busbar-connecting bushing and a second busbar-connecting bushing provided in the busbar compartment, the bushings each making the first and second busbars connectible/disconnectible;

the switch region, the earthing switch regions, the first busbar-connecting bushing, and the second busbar-connecting bushing being integrally molded to form a switch provided on an electrical phase-by-phase basis independently, wherein the switches for three phases are arranged in order side by side in the housing, in a longitudinal direction of the housing as viewed from its front; the first busbar-connecting bushing in each switch is located to a left side of the housing front, and the second busbar-connecting bushing is located to a right side of the housing front; the operating device for the switch region is disposed centrally with respect to the housing front, and the operating devices for the two sets of earthing switch regions are located to left and right sides of the operating device for the switch region; and the operating devices for the two sets of earthing switch regions include a handle insertion member disposed at the front side of the housing.

2. The vacuum insulated switchgear according to claim 1, wherein the switch for each phase includes a first earthing switch at left, and a second earthing switch at right, with respect to a front of the housing.

3. The vacuum insulated switchgear according to claim 1, wherein the operating devices for the two sets of earthing switch regions are of the same construction.

4. The vacuum insulated switchgear according to claim 1, wherein the operating device for the switch region is disposed at a lower side of each switch region of the switches for each phase; and the first and second busbar-connecting bushings of the switches for each phase are disposed at an upper side of the switch region.

5. The vacuum insulated switchgear according to claim 4, wherein the first busbar-connecting bushing is connected to a busbar extending from a feeder panel adjacent to one side of a bus section panel; and the second busbar-connecting bushing is connected to a busbar extending from a feeder panel adjacent to the other side of the bus section panel.

6. The vacuum insulated switchgear according to claim 2, wherein the operating device for the switch region is disposed centrally with respect to the housing front, and the operating devices for the two sets of earthing switch regions are located to left and right sides of the operating device for the switch region.

* * * * *